United States Patent
Katsuki (10) Patent No.: US 10,224,780 B2
(45) Date of Patent: Mar. 5, 2019

(54) MOTOR HAVING INTERNAL COOLANT SUPPLY PASSAGE

(71) Applicant: FANUC CORPORATION, Yamanashi (JP)

(72) Inventor: Kyouhei Katsuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 106 days.

(21) Appl. No.: 15/428,516

(22) Filed: Feb. 9, 2017

(65) Prior Publication Data

US 2017/0250586 A1    Aug. 31, 2017

(30) Foreign Application Priority Data

Feb. 29, 2016 (JP) ................................. 2016-037481

(51) Int. Cl.
*H02K 5/20* (2006.01)
*H02K 9/10* (2006.01)
*H02K 9/00* (2006.01)

(52) U.S. Cl.
CPC ................ *H02K 5/20* (2013.01); *H02K 9/00* (2013.01); *H02K 9/10* (2013.01); *H02K 2213/09* (2013.01)

(58) Field of Classification Search
CPC .................................. H02K 5/20; H02K 9/10
USPC .............................................. 310/53, 54, 62
See application file for complete search history.

(56) References Cited

U.S. PATENT DOCUMENTS

| 4,959,570 | A * | 9/1990 | Nakamura | H02K 9/19 310/45 |
| 6,304,011 | B1 * | 10/2001 | Pullen | H02K 1/20 310/52 |
| 6,555,936 | B1 * | 4/2003 | Tanaka | G03F 7/70716 310/12.06 |
| 7,247,959 | B2 * | 7/2007 | Chan | F28D 1/047 310/58 |
| 2011/0011101 | A1 * | 1/2011 | Hikawa | F25B 11/02 62/6 |

(Continued)

FOREIGN PATENT DOCUMENTS

| JP | 05-169985 | 7/1993 |
| JP | 2006-121780 | 5/2006 |
| JP | 2015-223022 | 12/2015 |

*Primary Examiner* — Terrance L Kenerly
(74) *Attorney, Agent, or Firm* — Wenderoth, Lind & Ponack, L.L.P.

(57) ABSTRACT

A motor includes: a rotor; an enclosure member having a front housing, a rear housing, and a stator surrounding the rotor; an output shaft-side coolant supply port on an outer circumference of the enclosure member; output shaft-side coolant supply paths configured to supply coolant from the output shaft-side coolant supply port to an output shaft side; a counter-output shaft-side coolant supply port on the outer circumference of the enclosure member; counter-output shaft-side coolant supply paths configured to supply coolant from the counter-output shaft-side supply port to a counter-output shaft side; a temperature measurement unit configured to measure a temperature of the enclosure member; switching parts configured to switch between a plurality of coolants based on the temperature of the enclosure member; and coolant flow paths that connect the output shaft-side coolant supply port and the counter-output shaft-side coolant supply port to the switching parts.

5 Claims, 4 Drawing Sheets

(56) References Cited

U.S. PATENT DOCUMENTS

2013/0145794 A1* 6/2013 Rasmussen .......... F01D 15/005
                                                                                             62/611
2014/0265667 A1* 9/2014 Boxberg ................ H02K 1/32
                                                                                             310/59

* cited by examiner

MOTOR HAVING INTERNAL COOLANT SUPPLY PASSAGE

This application is based on and claims the benefit of priority from Japanese Patent Application No. 2016-037481, filed on 29 Feb. 2016, the content of which is incorporated herein by reference.

BACKGROUND OF THE INVENTION

Field of the Invention

The present invention relates to a motor having an internal coolant supply passage.

Related Art

Conventionally, techniques for cooling motors have been widely known. For example, a motor cooling device has been proposed that includes a temperature detection means for detecting the inside temperature of a motor, a coolant flow path provided to the motor, and a coolant supply means for supplying coolant to the coolant flow path, in which coolant is supplied to the coolant flow path from the coolant supply means in the case of the inside temperature of the motor detected by the temperature detection means becoming at least a predetermined value (Refer to Japanese Unexamined Patent Application, Publication No. 2006-121780).

However, with the conventional cooling method of a motor, it is difficult to cool the motor efficiently. For example, even when cooling the motor based on the inside temperature of the motor, it is not possible to sufficiently cool the winding of the stator or the rotor using the technology of Japanese Unexamined Patent Application, Publication No. 2006-121780. In particular, adverse effects such as a decline in bearing lifespan (grease lifespan) have been considered by the heat generation of the rotor transferring to the bearings of the motor, and the temperature of the bearings thus rising. For this reason, a motor having a coolant flow path (coolant supply path) therein has been demanded that is capable of efficiently cooling the motor.

SUMMARY OF THE INVENTION

The present invention has an object of providing a motor having a coolant supply path inside thereof capable of efficiently cooling the motor.

A motor of the present invention includes: a rotor (e.g., the rotor 20 described later) supported by an output shaft-side bearing (e.g., the output shaft-side bearing 11 described later) and a counter-output shaft-side bearing (e.g., the counter-output shaft-side bearing 12 described later); an enclosure member (e.g., the enclosure member H described later) including a front housing (e.g., the front housing 50 described later) supporting the output shaft-side bearing, a rear housing (e.g., the rear housing 60 described later) supporting the counter-output shaft-side bearing, and a stator (e.g., the stator 30 described later) to which the front housing and the rear housing are installed at both ends and surrounding the rotor; an output shaft-side coolant supply port (e.g., the output shaft-side coolant supply port 52 described later) disposed at an outer circumference of the enclosure member; an output shaft-side coolant supply path (e.g., the inside coolant circulation path 53, coolant discharge path 54 described later) that supplies coolant from the output shaft-side coolant supply port to an output shaft side; a counter-output shaft-side coolant supply port (e.g., the counter-output shaft-side coolant supply port 62 described later) disposed at an outer circumference of the enclosure member; a counter-output shaft-side coolant supply path (e.g., the terminal box 15, rearward communicating path 58 described later) that supplies coolant from the counter-output shaft-side coolant supply port to a counter-output shaft side; a temperature measurement unit (e.g., the temperature sensor 35 described later) that measures a temperature of the enclosure member; a switching part (e.g., the output shaft-side switching part 69a, counter-output shaft-side switching part 69b described later) that switches between a plurality of coolants based on the temperature of the enclosure member measured by the temperature measurement unit; and a coolant flow path (e.g., the output shaft-side coolant flow path 51, counter-output shaft-side coolant flow path 61 described later) that connects the output shaft-side coolant supply port and the counter-output shaft-side coolant supply port.

In addition, it is preferable for the switching part to switch between types of coolants, based on the temperature of the enclosure member measured by the temperature measurement unit.

Furthermore, it is preferable for the switching part to switch an amount of coolant, based on the temperature of the enclosure member measured by the temperature measurement unit.

Moreover, it is preferable for the switching part to switch flow paths of coolants, based on the temperature of the enclosure member measured by the temperature measurement unit.

Additionally, it is preferable to further include a control unit that is electrically connected with the switching part, in which the control unit controls the switching part so as to switch coolant based on the temperature of the enclosure member measured by the temperature measurement unit.

According to the present invention, it is possible to provide a motor having a coolant supply path inside thereof capable of efficiently cooling the motor.

DETAILED DESCRIPTION OF THE INVENTION

Figure 1:
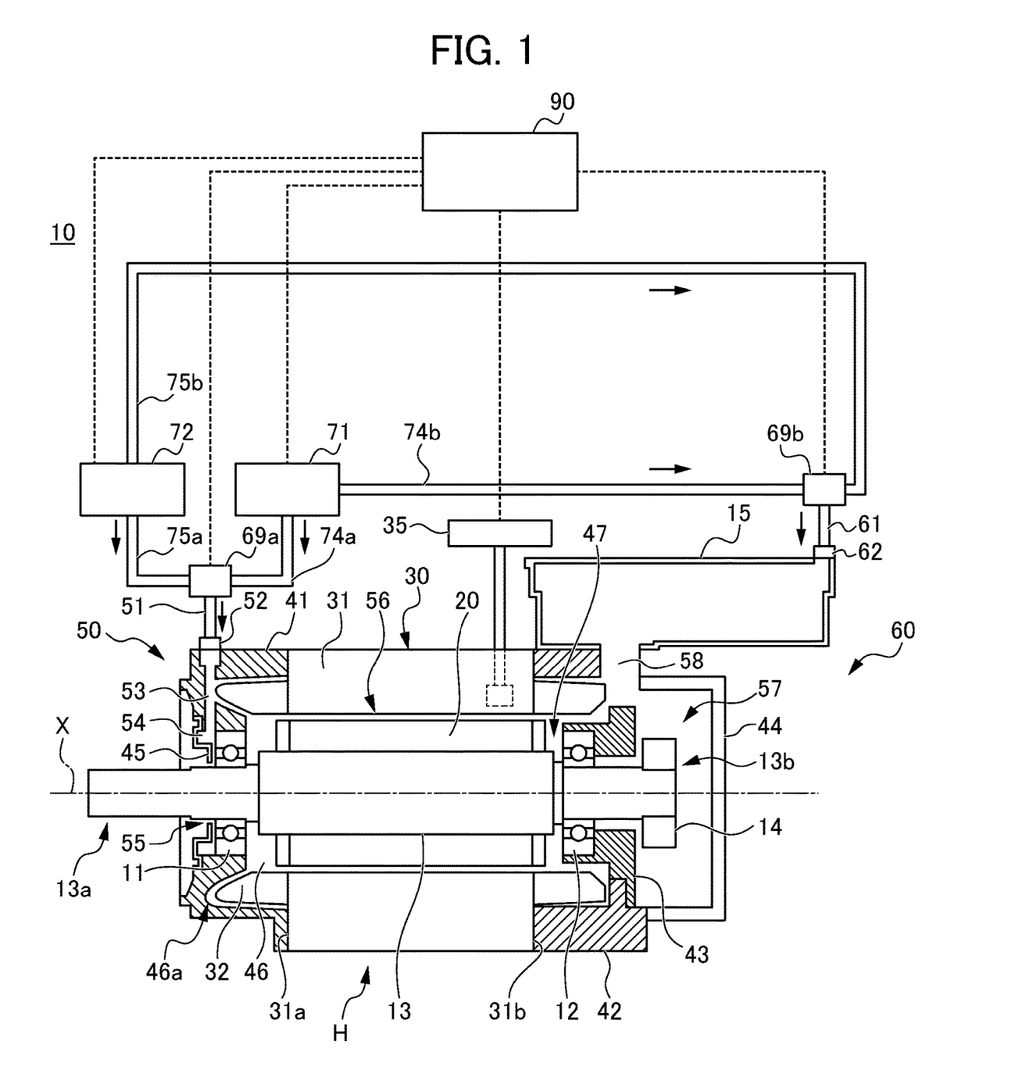
FIG. 1 is a longitudinal profile view schematically showing a motor according to the present embodiment.
Figure 2:
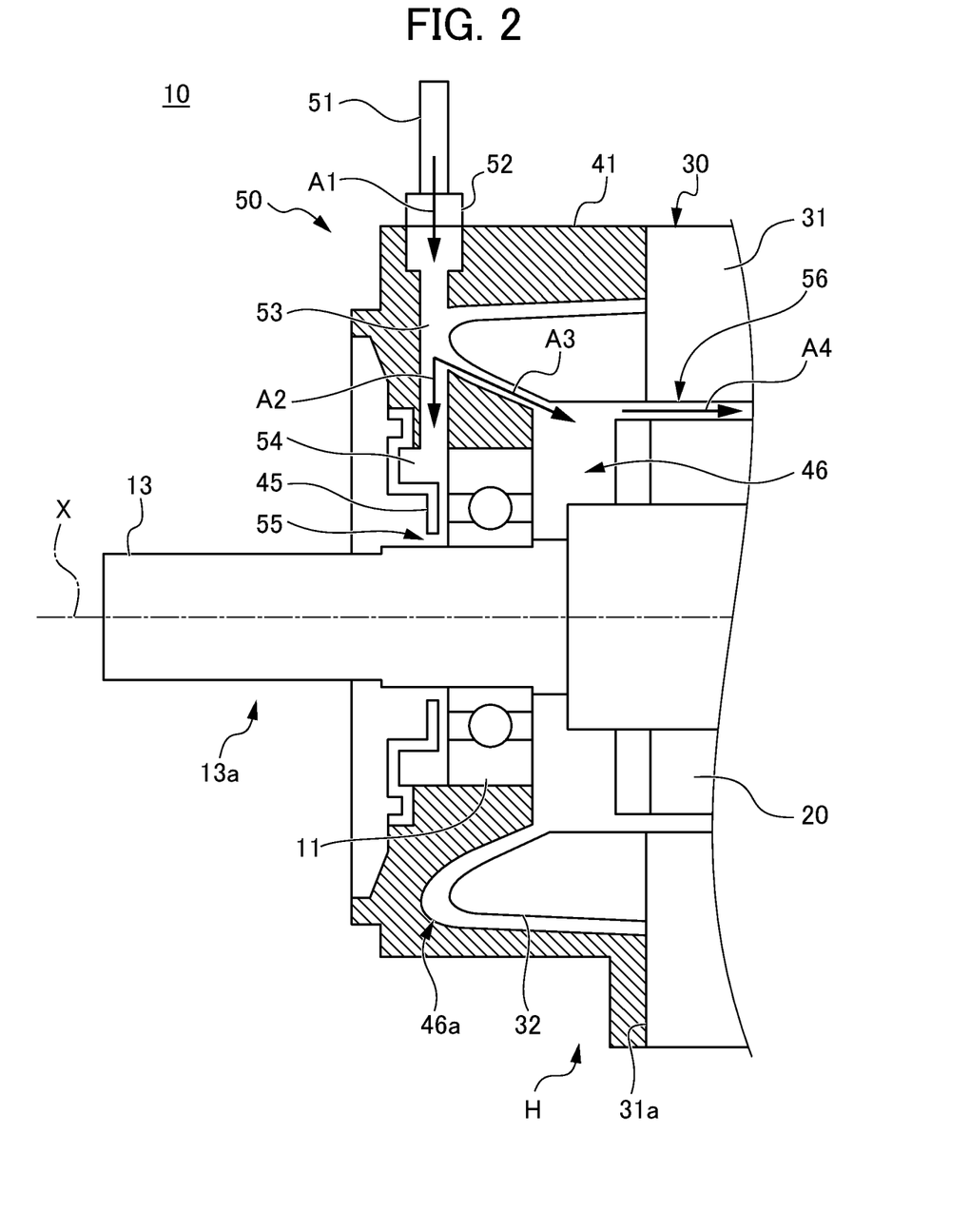
FIG. 2 is a partial enlarged view illustrating by enlarging a vicinity on an output shaft side of the motor in FIG. 1.
Figure 3:
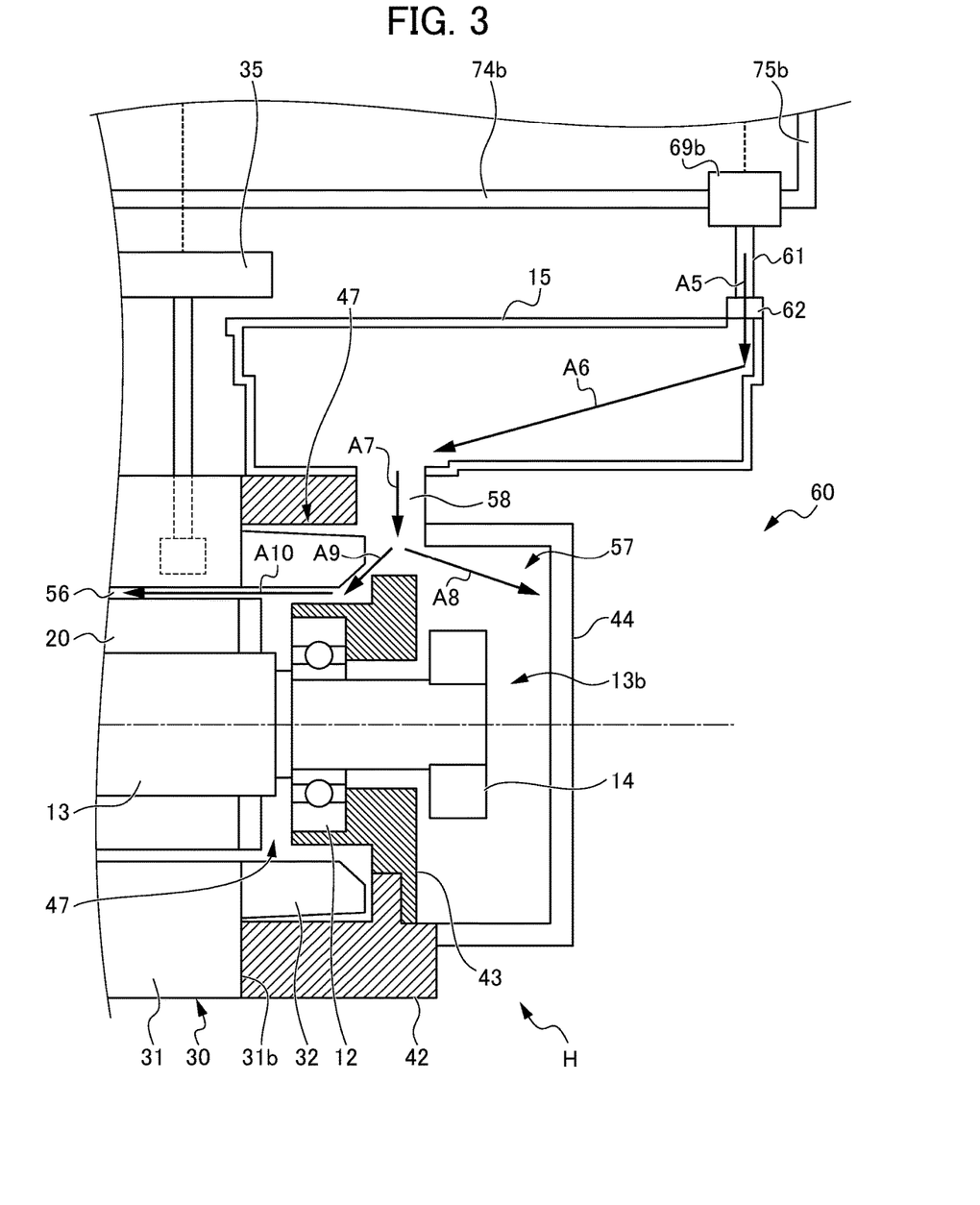
FIG. 3 is a partial enlarged view illustrating by enlarging a vicinity on a counter-output shaft side of the motor in FIG. 1.

An embodiment of a motor of the present invention will be explained by referencing FIGS. 1 to 3. FIG. 1 is a longitudinal profile view schematically showing a motor according to the present embodiment. FIG. 2 is a partial enlarged view illustrating by enlarging a vicinity on an output shaft side of the motor in FIG. 1. FIG. 3 is a partial enlarged view illustrating by enlarging a vicinity on a counter-output shaft side of the motor in FIG. 1.

As main configurations, a motor 10 of the present embodiment includes: a rotor 20 (rotor), a stator 30 (stator), a front housing 50, a rear housing 60, an output shaft-side bearing 11, a counter-output shaft-side bearing 12, an output shaft-side switching part 69 (part of switching part), a counter-output shaft-side switching part 69b (part of switching part), a coolant-for-cooling supply device 71, a coolant-for-airpurge supply device 72, a motor control device 90 as a control unit, and a temperature sensor 35 as a temperature measurement unit.

The rotor 20 is supported by the output shaft-side bearing 11 and counter-output shaft-side bearing 12. In detail, the rotor 20 includes a rotating shaft 13. The rotating shaft 13 is supported at both ends by the output shaft-side bearing 11 and counter-output shaft-side bearing 12, and is supported to be rotatable around a rotation axis line X. The rotor 20 rotates integrally with the rotating shaft 13 around the rotation shaft axis line X.

The rotating shaft 13 has a forward end 13a positioned at an end in a direction on the output shaft-side bearing 11 (hereinafter referred to as "output shaft side) relative to the rotating shaft 13, and a rear end 13b positioned at an end in a direction on a side of the counter-output shaft-side bearing 12 (hereinafter referred to as "counter-output shaft side") relative to the rotating shaft 13. An encoder 14 that detects the rotational position, rotational speed, etc. of the rotating shaft 13 is mounted to the rear end 13b.

The output shaft-side bearing 11 is arranged in the vicinity of the forward end 13a of the rotating shaft 13. The counter-output shaft-side bearing 12 is arranged in the vicinity of the rear end 13b of the rotating shaft 13 positioned on the opposite side to the forward end 13a.

The stator 30 is a member surrounding the rotor 20. In detail, the stator 30 is a member of generally cylindrically shape that extends along the rotation axis line X so as to encircle the rotor 20. The stator 30 includes a stator core 31 consisting of several electromagnetic steel plates that are layered, and a winding 32 that is wound on a projecting part (not illustrated) formed on the inner circumferential face of the stator core 31.

The stator core 31 has a front end face 31a positioned at an end on a side of the output shaft-side bearing 11, and a rear end face 31b positioned at an end on a side of the counter-output shaft-side bearing 12.

The winding 32 is fixed to the stator core 31 by way of resin or the like. The winding 32 extends along the rotation axis line X so as to project from both ends of the stator core 31. A lead wire (not illustrated) extending out from a terminal box 15 (described later) is connected to the winding 32. The winding 32 causes a rotating magnetic field to generate by way of the current supplied via the lead wire. The rotor 20 comes to rotate integrally with the rotating shaft 13 in accordance with the rotating magnetic field generated by the stator 30.

In the present embodiment, the stator 30, front housing 50, rear housing 60, output shaft-side bearing 11, counter-output shaft-side bearing 12, encoder 14, etc. constitute an "enclosure member H" that encircles the rotor 20.

The temperature sensor 35 is a device for measuring the temperature of the stator 30, in detail the temperature of the winding 32. It should be noted that the temperature of the stator 30 measured by the temperature sensor 35 is also referred to as "measured temperature T". In the present embodiment, the temperature sensor 35 is arranged from the inside of the stator 30 to outwards of the stator core 31 to enable measuring of the temperature of the winding 32. The temperature sensor 35 is electrically connected with the motor control device 90. The signal of the measured temperature T is sent to the motor control device 90.

The front housing 50 supports the output shaft-side bearing 11. The rear housing 60 supports the counter-output shaft-side bearing 12.

The front housing 50 has the front housing component 41 and forward cover 45. In addition, the rear housing 60 has a rear housing component 42, holding ring 43, rearward cover 44, and terminal box 15.

The front housing component 41 and rear housing component 42 encircle the winding 32 projecting from the stator core 31. The forward winding accommodating space 46 is formed by the front housing component 41 and the winding 32. In addition, a rearward winding accommodating space 47 is formed by the rear housing component 42 and winding 32.

The front housing component 41 is screwed to the front end face 31a of the stator core 31. The front housing component 41 supports the output shaft-side bearing 11. The front housing component 41 extends from the front end face 31a of the stator core 31 towards the forward end 13a of the rotating shaft 13, and encircles part of the rotating shaft 13 and the output shaft-side bearing 11. In addition, the forward cover 45 having a generally cylindrical shape is mounted to the front housing component 41.

The forward cover 45 projects at an inner side in a radial direction towards the rotating shaft 13. The forward end 13 of the rotating shaft 13 projects from the front housing component 41 and forward cover 45.

The forward end 13a of the rotating shaft 13 projecting from the front housing component 41 and forward cover 45 functions as an output shaft that is either directly or indirectly connected to the main shaft of a machine tool, for example.

The rear housing component 42 is screwed to the rear end face 31b of the stator core 31. The rear housing component 42 extends from the rear end face 31b of the stator core 31 towards the rearward end 13b of the rotating shaft 13, and encircles a part of the rotating shaft 13 and counter-output shaft-side bearing 12.

The holding ring 43 is screwed to the rear housing component 42. The holding ring 43 supports the counter-output shaft-side bearing 12.

The rearward cover 44 is mounted to the rear housing component 42. The rearward cover 44 encircles the rearward end 13b of the rotating shaft 13 projecting from the rear housing component 42.

The terminal box 15 is a member having an internal space, and is connected to the rear housing component 42.

The output shaft-side switching part 69a switches so as to selectively supply coolant from the coolant-for-air-purge supply device 72 or coolant-for-cooling supply device 71 towards the output shaft side of the motor 10. In addition, the counter-output shaft-side convertor 69b switches so as to selectively supply coolant from the coolant-for-air-purge supply device 72 or coolant-for-cooling supply device 71 towards the counter-output shaft side of the motor 10. The output shaft-side switching part 69a and counter-output shaft-side switching part 69b are electrically connected to the motor control device 90. The output shaft-side switching part 69a and counter-output shaft-side switching part 69b can switch between a plurality of coolants based on the temperature of the stator 30 (measured temperature T) measured by the temperature sensor 35. In detail, the output shaft-side switching part 69a and counter-output shaft-side switching part 69b can switch at least one of any of the type of coolant, amount of coolant and flow path of coolant, based on the measured temperature T.

The coolant-for-air-purge supply device 72 is a device that supplies coolant for air purge as coolant selectively to the output shaft-side switching part 69a and counter-output shaft-side switching part 69b. An output shaft-side air-purge flow path 75a and counter-output shaft-side air-purge flow path 75b are connected to the coolant-for-air-purge supply device 72. The coolant-for-air-purge supply device 72 is electrically connected with the motor control device 90. In the present embodiment, compressed air for air purge (air) is used as the coolant for normal cooling.

The output shaft-side air-purge flow path 75a connects the coolant-for-air-purge supply device 72 and the output shaft-side switching part 69a. In addition, the counter-output shaft-side air-purge flow path 75b connects the coolant-for-air-purge supply device 72 and the counter-output shaft-side switching part 69b.

The coolant-for-cooling supply device 71 is a device that supplies coolant for cooling as the coolant selectively to the output shaft-side switching part 69a and counter-output shaft-side switching part 69b. An output shaft-side cooling coolant flow path 74a and counter-output shaft-side cooling coolant flow path 74b are connected to the coolant-for-cooling supply device 71. The coolant-for-cooling supply device 71 is electrically connected with the motor control device 90. In the present embodiment, nitrogen is used as a coolant for quick cooling.

The output shaft-side cooling coolant flow path 74a connects the coolant-for-cooling supply device 71 and the output shaft-side switching part 69a. In addition, the counter-output shaft-side cooling coolant flow path 74b connects the coolant-for-cooling supply device 71 and the counter-output shaft-side switching part 69b.

As shown in FIG. 2, an output shaft-side flow path that supplies coolant from the output shaft-side switching part 69a towards the output shaft side of the motor 10 (circumference of output shaft-side bearing 11) is formed in the front housing 50. In the present embodiment, the output shaft-side flow path has an output-side coolant flow path 51, output shaft-side coolant supply port 52, inside coolant circulation path 53, coolant discharge path 54, coolant outlet port 55, and communicating part 56, as a coolant flow path.

The output shaft-side coolant flow path 51 connects the output shaft-side coolant supply port 52 and the output shaft-side switching part 69a. The output shaft-side coolant flow path 51 causes the coolant to circulate from the output shaft-side switching part 69a to the output shaft-side coolant supply port 52.

The output shaft-side coolant supply port 52 is arranged at the outer circumference of the front housing 50. The output shaft-side coolant supply port 52 introduces coolant from outside of the stator 30 towards the output shaft side of the motor 10.

The inside coolant circulation path 53 extends the inside of the front housing component 41 in a direction orthogonal to the rotation axis line X of the rotor 20 (hereinafter referred to as "radial direction"). The inside coolant circulation path 53 is formed by a through hole penetrating the front housing component 41 in the radial direction. The inside coolant circulation path 53 extends linearly from the output shaft-side coolant supply port 52 towards the inner side in the radial direction. The inside coolant circulation path 53 is formed in the front housing component 41 by way of machining, for example.

In addition, in the present embodiment, the inside coolant circulation path 53 communicates with the forward winding accommodating space 46 that accommodates the winding 32 of the stator 30. As shown in FIG. 2, the inside coolant circulation path 53 and forward winding accommodating space 46 communicate with each other at a forward terminal part 46a of the forward winding accommodating space 46. In the present embodiment, the forward terminal part 46a of the forward winding accommodating space 46 is provided at a position exceeding the output shaft-side bearing 11. In other words, the terminal part 46a of the forward winding accommodating space 46 is positioned on an extension line of the inside coolant circulation path 53.

The coolant discharge path 54 is positioned at an end of the inside coolant circulation path 53 (position adjacent to the rotating shaft 13), with the profile being formed by the forward cover 45.

The coolant output port 55 discharges the coolant to outside from the coolant discharge path 54. The coolant outlet port 55 is formed in the vicinity of the outer circumferential surface of the rotating shaft 13, and connects outside the system and the coolant discharge path 54. The coolant supplied from the inside coolant circulation path 53 thereby comes to be discharged to outside of the motor 10 through the coolant discharge path 54 and coolant outlet port 55.

The communicating part 56 communicates the forward winding accommodating space 46 and the rearward winding accommodating space 47. Coolant is supplied from the inside coolant circulation path 53 to the communicating part 56, and the coolant is supplied from a rearward communicating path 58 as described later.

In the motor 10 according to the present embodiment, the inside coolant circulation path 53 and coolant discharge path 54 function as an "output shaft-side coolant supply path" that supplies coolant from the output shaft-side coolant supply port 52 to the output shaft side. In detail, the coolant supplied from the output shaft-side coolant supply port 52 is introduced to the inside coolant circulation path 53 which is formed linearly, as shown by the arrow A1 in FIG. 2. The coolant flowing through the inside coolant circulation path 53 is supplied through the coolant discharge path 54 to the output shaft side, as shown by the arrow A2. The coolant is discharged to outside of the motor 10 from the coolant discharge path 54 through the coolant outlet port 55.

As described earlier, the inside coolant circulation path 53 is in communication with the forward winding accommodating space 46. Therefore, a part of the flow of coolant passing the inside coolant circulation path 53 flows into the forward winding accommodating space 46, as shown by the arrow A3. The coolant is stored inside of the forward winding accommodating space 46, and a part thereof comes to flow towards the rearward winding accommodating space 47 through the communicating part 56, as shown by the arrow A4.

As shown in FIG. 3, a flow path (hereinafter referred to as "counter-output shaft-side flow path") supplying coolant from the counter-output shaft-side switching part 69b towards the counter-output shaft side of the motor 10 (circumference of the counter-output shaft-side bearing 12) is formed in the rear housing 60. In the present embodiment, the counter-output shaft-side flow path has the counter-output shaft-side coolant flow path 61 as the coolant flow path, counter-output shaft-side coolant supply port 62, terminal box 15, rearward communicating flow path 58 and rearward space 57.

The counter-output shaft-side coolant flow path 61 connects the counter-output shaft-side coolant supply port 62 and counter-output shaft-side switching part 69b. The counter-output shaft-side coolant flow path 61 supplies coolant from the counter-output shaft-side switching part 69b until the counter-output shaft-side coolant supply port 62.

The counter-output shaft-side coolant supply port 62 is arranged at the outer circumference of the rear housing 60. The counter-output shaft-side coolant supply port 62 introduces coolant from the outside of the stator 30 towards the counter-output shaft side of the motor 10.

An internal space is formed in the terminal box 15 so as to supply coolant from the counter-output shaft-side coolant supply port 62 to the rearward communicating path 58.

The rearward communicating path 58 is connected with the rearward winding accommodating space 47. The rearward communicating path 58 supplies coolant to the communicating part 56 via the rearward winding accommodating space 47 from the terminal box 15. In addition, the rearward communicating path 58 supplies coolant from the terminal box 15 to the rearward space 57.

The rearward space 57 is a space formed by the rear housing component 42 and rearward cover 44. The rearward communicating path 58 is connected to the rearward space 57.

In the motor 10 according to the present embodiment, the terminal box 15 and rearward communicating path 58 function as an "counter-output shaft-side coolant supply flow path" that supplies coolant from the counter-output shaft-side coolant supply port 62 to the counter-output shaft side. In detail, in the motor 10 according to the present embodiment, the coolant supplied from the counter-output shaft-side coolant supply port 62 is introduced to the terminal box 15 in which the internal space is formed, as shown by the arrow A5 in FIG. 3. The coolant flowing through the terminal box 15 is supplied from the coolant supply port 62 via the terminal box 15 and rearward communicating path 58 to the counter-output shaft side, as shown by the arrows A6 and A7.

The coolant supplied from the rearward communicating path 58 is introduced to the rearward space 57, as shown by the arrow A8 in FIG. 3.

The rearward communicating path 58 connects with the rearward winding accommodating space 47. Therefore, a part of the flow of coolant passing through the rearward communicating path 58 flows into the rearward winding accommodating space 47, as shown by the arrow A9. The coolant is stored inside of the rearward winding accommodating space 47, and a part of the coolant comes to flow through the communicating part 56 towards the forward winding accommodating space 46, as shown by the arrow A10.

The motor control device 90 is realized by a processor equipped with a communication circuit, etc., and performs various controls in accordance with processing programs stored in memory that is not illustrated. The motor control device 90 is electrically connected with the output shaft-side switching part 69*a* and the counter-output shaft-side switching part 69*b*, and controls the output shaft-side switching part 69*a* and the counter-output shaft-side switching part 69*b* based on the temperature of the stator 30 measured by the temperature sensor 35 to perform cooling processing of the motor 10.

In the cooling processing of the motor 10, the motor control device 90 can execute quick cooling processing or normal cooling processing based on the temperature of the stator 30 (measured temperature T) measured by the temperature sensor 35. The motor control device 90, in the case of executing quick cooling processing or normal cooling processing, in cooperation with the output shaft-side switching part 69*a* and counter-output shaft-side switching part 69*b*, functions as a switching part that switches between a plurality of coolants based on the temperature of the stator 30 (measured temperature T) measured by the temperature sensor 35.

In the case of the motor control device 90 executing quick cooling processing, the motor control device 90 sends a first control signal to the coolant-for-cooling supply device 71, so as to switch the type of coolant to the quick-cooling coolant. The coolant-for-cooling supply device 71 supplies the quick-cooling coolant to the output shaft-side cooling coolant flow path 74*a* and counter-output shaft-side cooling coolant flow path 74*b*, in accordance with the received first control signal. In addition, the motor control device 90 sends a second control signal to the output shaft-side switching part 69*a* and counter-output shaft-side switching part 69*b*. The output shaft-side switching part 69*a* and counter-output shaft-side switching part 69*b* switch the type of coolant by switching the flow path of coolant so as to supply the quick-cooling coolant to the output shaft-side coolant flow path 51 via the output shaft-side cooling coolant flow path 74*a*, and so as to supply coolant to the counter-output shaft-side coolant flow path 61 via the counter-output shaft-side cooling coolant flow path 74*b*, in accordance with the received second control signal. The quick-cooling coolant is supplied to the output shaft-side coolant supply port 52 through the output shaft-side coolant flow path 51, and is supplied to the counter-output shaft-side coolant supply port 62 through the counter-output shaft-side coolant flow path 61.

In the present embodiment, the motor control device 90 sends the first control signal corresponding to the temperature of the stator 30 (measured temperature T) measured by the temperature sensor 35 to the coolant-for-cooling supply device 71. More specifically, the amount of quick-cooling coolant corresponding to the temperature of the stator 30 measured by the temperature sensor 35 is stored in the memory of the motor control device 90 in advance. Therefore, the motor control device 90, output shaft-side switching part 69*a* and counter-output shaft-side switching part 69*b* can control the coolant-for-cooling supply device 71 so as to switch the amount of the quick-cooling coolant, based on the temperature of the stator 30 measured by the temperature sensor 35.

In the case of executing quick cooling processing as mentioned above, the coolant-for-cooling supply device 71 supplies the quick-cooling coolant to the output shaft-side coolant supply port 52, via the output shaft-side cooling coolant flow path 74*a*, output shaft-side switching part 69*a* and output shaft-side coolant flow path 51. In addition, the coolant-for-cooling supply device 71 supplies the quick-cooling coolant to the counter-output shaft-side coolant supply port 62 via the counter-output shaft-side cooling coolant flow path 74*b*, counter-output shaft-side switching part 69*b* and counter-output shaft-side coolant flow path 61.

In the case of the motor control device 90 executing normal cooling processing, the motor control device 90 sends a third control signal to the coolant-for-air-purge supply device 72, so as to switch the type of coolant to the normal cooling coolant. The coolant-for-air-purge supply device 72 supplies the normal cooling coolant until the output shaft-side air-purge flow path 75*a* and counter-output shaft-side air-purge flow path 75*b*, in accordance with the received third control signal. In addition, the motor control device 90 sends a fourth control signal to the output shaft-side switching part 69*a* and counter-output shaft-side switching part 69*b*. The output shaft-side switching part 69*a* and counter-output shaft-side switching part 69*b* switch the type of coolant by switching the flow path of coolant so as to supply the normal cooling coolant until the output shaft-side coolant flow path 51 via the output shaft-side air-purge flow path 75*a*, and so as to supply coolant until the counter-output shaft-side coolant flow path 61 via the counter-output shaft-side air-purge flow path 75*b*. The normal cooling coolant is supplied to the output shaft-side coolant supply port 52 through the output shaft-side coolant flow path 51, and is supplied to the counter-output shaft-side coolant supply port 62 through the counter-output shaft-side coolant flow path 61.

In the present embodiment, the motor control device 90 sends, to the coolant-for-air-purge supply device 72, the third control signal corresponding to the temperature of the stator 30 (measured temperature T) measured by the temperature sensor 35. More specifically, the amount of the normal cooling coolant corresponding to the temperature of the stator 30 measured by the temperature sensor 35 is stored in the memory of the motor control device 90 in advance. Therefore, the motor control device 90, output shaft-side switching part 69a and counter-output shaft-side switching part 69b can control the coolant-for-air-purge supply device 72 so as to switch the amount of the normal cooling coolant, based on the temperature of the stator 30 measured by the temperature sensor 35.

In the case of executing normal cooling processing as mentioned above, the coolant-for-air-purge supply device 72 supplies coolant to the output shaft-side coolant supply port 52 via the output shaft-side air-purge flow path 75a, output shaft-side switching part 69a and output shaft-side coolant flow path 51. In addition, the coolant-for-air-purge supply device 72 supplies the normal cooling coolant to the counter-output shaft-side coolant supply port 62 via the counter-output shaft-side air-purge flow path 75b, counter-output shaft-side switching part 69b and counter-output shaft-side coolant flow path 61.

Figure 4:
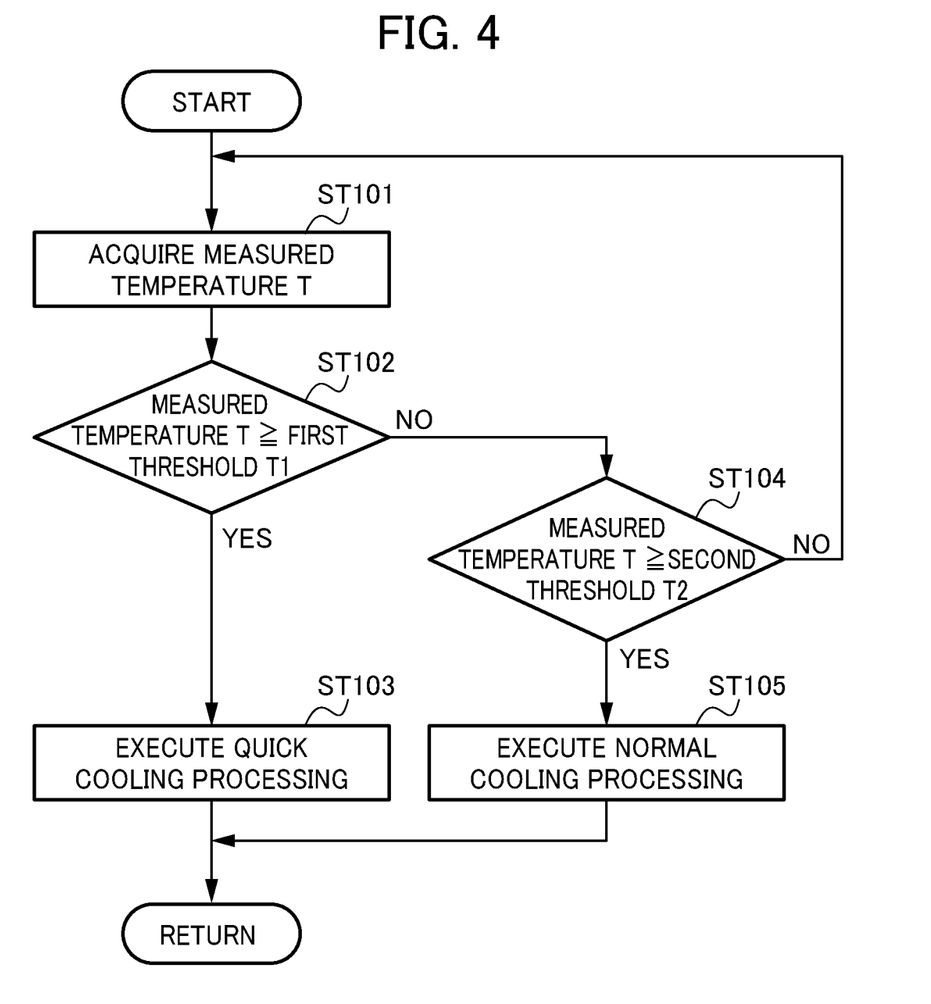
FIG. 4 is a flowchart showing operation of a cooling process of the motor.

An example of the cooling processing of the motor 10 executed by the motor control device 90 will be explained by referencing FIG. 4. FIG. 4 is a flowchart showing operations of cooling processing of the motor. Operations of the processing shown in this flowchart are repeatedly executed during the operation of the motor 10.

In Step ST101 shown in FIG. 4, the motor control device 90 acquires the measured temperature T of the stator 30 measured by the temperature sensor 35.

In the Step ST102, the motor control device 90 determines whether the measured temperature T is at least a first threshold T1. In the case of the measured temperature T being at least the first threshold T1 (measured temperature T≥first threshold T1), the processing advances to Step ST103. On the other hand, in the case of the measured temperature T being less than the first threshold T1 (measured temperature T<first threshold T1), the processing advances to Step ST104.

In Step ST103, the motor control device 90 controls the output shaft-side switching part 69a and counter-output shaft-side switching part 69b, as well as the coolant-for-air-purge supply device 72 and coolant-for-cooling supply device 71, so as to execute quick cooling processing. In the present embodiment, the nitrogen as the quick-cooling coolant is supplied from the coolant-for-cooling supply device 71 to the inside of the motor 10 via the output shaft-side switching part 69a and counter-output shaft-side switching part 69b (refer to FIGS. 2 and 3). The processing flow ends (returns) by the quick cooling processing ending.

In Step ST104, the motor control device 90 determines whether the measured temperature T is at least a second threshold T2. In the case of the measured temperature T being high at the second threshold T2 or higher (measured temperature second threshold T2), the processing advances to Step ST105. On the other hand, in the case of the measured temperature T being less than the second threshold T2 (measured temperature T<second threshold T2), the processing returns to Step ST101.

In Step ST105, the motor control device 90 controls the output shaft-side switching part 69a and counter-output shaft-side switching part 69b, as well as the coolant-for-air-purge supply device 72 and coolant-for-cooling supply device 71, so as to normal cooling processing. In the present embodiment, air as the normal cooling coolant is supplied from the coolant-for-air-purge supply device 72 to the inside of the motor 10 via the output shaft-side switching part 69a and counter-output shaft-side switching part 69b (refer to FIGS. 2 and 3). The processing flow ends (returns) by the normal cooling processing ending.

The following effects are exerted by the motor 10 of the present embodiment, for example.

The motor 10 of the present embodiment includes: the rotor 20 supported by the output shaft-side bearing 11 and counter-output shaft-side bearing 12; the enclosure member H that includes the front housing 50 supporting the output shaft-side bearing 11, the rear housing 60 supporting the counter-output shaft-side bearing 12, as well as the stator 30 to which the front housing 50 and rear housing 60 are installed at both ends thereof and surrounding the rotor 20; the output shaft-side coolant supply port 52 arranged on the outer circumference of the enclosure member H; the output shaft-side coolant support path 53, 54 supplying coolant from the output shaft-side coolant supply port 52 to the output shaft side; the counter-output shaft-side coolant supply port 62 arranged on the outer circumference of the enclosure member H; the counter-output shaft-side coolant supply path 15, 58 supplying coolant from the counter-output shaft-side coolant supply port 62 to the counter-output shaft side; the temperature measurement unit 35 that measures the temperature of the enclosure member H; the switching parts 69a, 69b that switch between a plurality of coolants based on the temperature of the enclosure member H measured by the temperature measurement unit 35; and the coolant flow paths 51, 61 that connect the output shaft-side coolant supply port 52 and counter-output shaft-side coolant supply port 62 to the switching parts 69a, 69b.

For this reason, it is possible to efficiently supply coolant to the output shaft side and counter-output shaft side of the motor 10. Furthermore, it is possible to supply coolant by switching based on the temperature of the enclosure member H. Therefore, it is possible to cool the motor 10 efficiently and in a short time. It is thereby possible to suppress a temperature rise in the motor 10, and possible to achieve output improvement and lengthen service life of the motor 10.

In addition, as the flow path for flowing coolant, an air-purge flow path for a sealing improvement of the motor 10 is employed, and the temperature of the motor 10 is further monitored. By switching from the air-purge compressed air flowing in the flow path to the quick-cooling coolant for of the motor, it is thereby possible to use the low-temperature quick-cooling coolant only when the motor is high temperature, and thus there is also an advantage linked to resource savings (cost cutting).

Furthermore, by jointly using the air-purge flow path, the effect of a sealing improvement from air purge is also obtained, irrespective of the temperature of the motor.

In addition, the output shaft-side switching part 69a and counter-output shaft-side switching part 69b switch the type of coolant based on the temperature of the enclosure member H measured by the temperature sensor 35. For this reason, for example, in the case of the temperature measured by the temperature sensor 35 being high temperature, it is possible to supply coolant of a type having high cooling efficiency to the motor 10. Therefore, it is possible to more efficiently cool the motor 10.

In addition, the output shaft-side switching part 69a and counter-output shaft-side switching part 69b switch the amount of coolant based on the temperature of the enclosure member H measured by the temperature sensor 35. For this reason, in the case of the temperature measured by the temperature sensor 35 being high temperature, for example, it is possible to increase the supply amount of coolant. Therefore, it is possible to more efficiently cool the motor 10.

In addition, the output shaft-side switching part 69a and counter-output shaft-side switching part 69b switch the flow path of coolant based on the temperature of the enclosure member H measured by the temperature sensor 35. For example, the flow path of coolant is connected to the supply source of coolant corresponding to the flow path of coolant (in the present embodiment, the coolant-for-cooling supply device 71 and coolant-for-air-purge supply device 72). It is thereby possible to more efficiently lower the temperature of the motor 10.

In addition, the motor 10 of the present embodiment further includes the motor control device 90 that is electrically connected with the output shaft-side switching part 69a and counter-output shaft-side switching part 69b, the motor control device 90 controlling the output shaft-side switching part 69a and counter-output shaft-side switching part 69b so as to switch the coolant based on the temperature of the enclosure member H measured by the temperature sensor 35. For this reason, it is possible to switch between a plurality of coolants more smoothly. Therefore, it is possible to more efficiently lower the temperature of the motor 10.

The present invention is not to be limited to the above-mentioned embodiment, and various changes and modifications are possible thereto. For example, the position at which the output shaft-side coolant supply port 52 is arranged is not limited to the front housing 50, and may be the stator 30 or rear housing 60. The position at which the counter-output shaft-side coolant supply port 62 is arranged is not limited to the rear housing 60, and may be the stator 30 or front housing 50.

In addition, an example of switching between a plurality of coolants based on the temperature of the enclosure member H by the motor control device 90 controlling the output shaft-side switching part 69a and counter-output shaft-side switching part 69b is explained in the above-mentioned embodiment. Not limiting thereto, it is possible to make a configuration that mechanically controls the output shaft-side switching part 69a and counter-output shaft-side switching part 69b. More specifically, it may switch between a plurality of coolants by mechanically switching the flow path connected to the output shaft-side switching part 69a and counter-output shaft-side switching part 69b by way of a member that greatly expands thermally or a member that greatly deforms (closes/opens the flow path) accompanying temperature changes of the enclosure member H.

In addition, the type of coolant supplied to the motor 10 is not limited to air and nitrogen. The coolant may not be gaseous, but rather liquid.

In addition, although an example of supplying coolant to the motor 10 by way of the two coolant supply devices of the coolant-for-cooling supply device 71 and the coolant-for-air-purge supply device 72 is explained in the above-mentioned embodiment, there may be three or more coolant supply devices. In addition, it is possible to use a coolant supply device capable of supplying a plurality of coolants with one coolant supply device.

In the embodiment, although the enclosure member H includes the stator 30, front housing 50, rear housing 60, output shaft-side bearing 11, counter-output shaft-side bearing 12, encoder 14, etc., it is not limited thereto. If the enclosure member H includes at least the stator 30, the front housing 50 and rear housing 60, it may not necessarily include the output shaft-side bearing 11, counter-output shaft-side bearing 12, encoder 14, etc, and may include other constituent members.

In the embodiment, although the temperature sensor 35 measures the temperature of the winding 32 of the stator 30, it is not limited thereto. The enclosure member H measured by the temperature sensor 35 may be at a site other than the stator 30, and may be the front housing 50, rear housing 60, output shaft-side bearing 11, counter-output shaft-side bearing 12, encoder 14 or the like.

EXPLANATION OF REFERENCE NUMERALS 10 motor
11 output shaft-side bearing (enclosure member)
12 counter-output shaft-side bearing (enclosure member)
14 encoder (enclosure member)
15 terminal box (counter-output shaft-side coolant supply flow path)
20 rotor
30 stator (enclosure member)
35 temperature sensor (temperature measurement unit)
50 front housing (enclosure member)
51 output shaft-side coolant flow path (coolant flow path)
52 output shaft-side coolant supply port
53 inside coolant circulation path (output shaft-side coolant supply path)
54 coolant discharge path (output shaft-side coolant supply flow path)
60 rear housing (enclosure member)
61 counter-output shaft-side coolant flow path (coolant flow path)
62 counter-output shaft-side coolant supply port
69a output shaft-side switching part (switching part)
69b counter-output shaft-side switching part (switching part)
71 coolant-for-cooling supply device
72 coolant-for-air-purge supply device
90 motor control device (control unit)
H enclosure member

What is claimed is:
1. A motor comprising:
a rotor supported by an output shaft-side bearing and a counter-output shaft-side bearing;
an enclosure member including a front housing supporting the output shaft-side bearing, a rear housing supporting the counter-output shaft-side bearing, and a stator surrounding the rotor, both ends of the front housing and the rear housing being mounted to the stator;
an output shaft-side coolant supply port at an outer circumference of the enclosure member;
an output shaft-side coolant supply path configured to supply coolant from the output shaft-side coolant supply port to an output shaft side;
a counter-output shaft-side coolant supply port at the outer circumference of the enclosure member;

a counter-output shaft-side coolant supply path configured to supply coolant from the counter-output shaft-side coolant supply port to a counter-output shaft side;

a temperature measurement unit configured to measure a temperature of the enclosure member;

an output shaft-side switching part configured to switch between a plurality of coolants based on the temperature of the enclosure member measured by the temperature measurement unit;

a counter-output shaft-side switching part configured to switch between the plurality of coolants based on the temperature of the enclosure member measured by the temperature measurement unit;

a coolant-for-cooling supply device configured to supply coolant for cooling selectively to the output shaft-side switching part and the counter-output shaft-side switching part;

an output shaft-side cooling coolant flow path that connects the coolant-for-cooling supply device and the output shaft-side switching part;

a counter-output shaft-side cooling coolant flow path that connects the coolant-for-cooling supply device and the counter-output shaft-side switching part;

a coolant-for-air-purge supply device configured to supply coolant for air purge selectively to the output shaft-side switching part and the counter-output shaft-side switching part;

an output shaft-side air-purge flow path that connects the coolant-for-air-purge supply device and the output shaft-side switching part; and a counter-output shaft-side air-purge flow path that connects the coolant-for-air-purge supply device and the counter-output shaft-side switching part.

2. The motor according to claim 1, wherein at least one of the output shaft-side switching part and the counter-output shaft-side switching part is configured to switch between types of coolant, based on the temperature of the enclosure member measured by the temperature measurement unit.

3. The motor according to claim 1, wherein at least one of the output shaft-side switching part and the counter-output shaft-side switching part is configured to switch an amount of coolant based on the temperature of the enclosure member measured by the temperature measurement unit.

4. The motor according to claim 1, wherein at least one of the output shaft-side switching part and the counter-output shaft-side switching part is configured to switch between flow paths of coolant based on the temperature of the enclosure member measured by the temperature measurement unit.

5. The motor according to claim 1, further comprising a control unit that is electrically connected with at least one of the output shaft-side switching part and the counter-output shaft-side switching part, wherein the control unit is configured to control the at least one of the output shaft-side switching part and the counter-output shaft-side switching part so as to switch coolant based on the temperature of the enclosure member measured by the temperature measurement unit.

* * * * *